Patented Apr. 12, 1932

1,854,165

UNITED STATES PATENT OFFICE

IRVIN W. HUMPHREY, OF DOVER, NEW JERSEY, ASSIGNOR TO HERCULES POWDER COMPANY, OF WILMINGTON, DELAWARE, A CORPORATION OF DELAWARE

METHOD OF REFINING TURPENTINE

No Drawing. Application filed June 22, 1926. Serial No. 117,867.

My invention relates to an improved method for refining wood turpentine with the object of producing a turpentine free from objectionable odor and objectionable odor producing constituents.

Turpentine, as is well known, is a product of the pine tree and may be obtained either by treatment of pine gum for the production of gum turpentine or by treatment of waste pine wood or pine stumps for the production of wood turpentine.

The wood turpentine, with the refining of which my invention more particularly deals, is produced by extracting or distilling waste pine wood, or pine stump wood milled to facilitate the removal of the turpentine, with steam or heat in suitable extractors. The products extracted by the distillation process consist of turpentine, pine oil, rosin, tar etc., which are separated by fractional distillation.

Refined wood turpentine obtained by the steam or destructive distillation processes, 90%–95% of which distils at a temperature below 170° C., has the same boiling range as that of gum turpentine and has found wide use in the arts on account of its uniformity and solvent properties, in which respects it is superior to gum turpentine.

Wood turpentine is, however, objectionable to some consumers because of its odor, which is often considered stronger than that of gum turpentine, and there is a preference for gum turpentine by some users despite the superiority of wood turpentine in certain respects.

The cause of the odor possessed by wood turpentine and a method of eliminating it, has been sought by investigators, but no satisfactory solution of the problem has been reached heretofore, though I am aware that it is the practice among producers of wood turpentine to subject it to an alkali refining, in order to remove traces of phenols, aldehydes and organic acids, the removal of which improves the odor somewhat, but does not result in making the product less objectionable from the standpoint under consideration. I am also aware that the objectionable odor may be largely removed from wood turpentine by thorough fractional distillation, since the objectionable substance is higher boiling than the other chief constituents of wood turpentine. Refining by fractional distillation, however, is not the most satisfactory solution of the problem since great care must be exercised and losses may occur which make the process uneconomic.

The cause of the objectionable odor of wood turpentine, that is to say, the exact nature of the odor producing constituent of the turpentine, is not entirely clear to me, although its chemical reactions, as well as its behavior, in the course of the treatment of the turpentine by the process involving my invention, indicate that the odor producing component may be an oxygenated body, possibly a ketone.

Now, in accordance with my present invention, the practice of which will be hereinafter more fully described in detail, I accomplish the refining of wood turpentine by treatment with a solvent having a selective solvent action upon the objectionable constituent of the turpentine which is responsible for the objectionable odor. The solvent acts, as it were, to extract the objectionable constituent and enable the recovery of a turpentine substantially free from objectionable odor and with an odor no stronger than that of fresh gum turpentine.

As the solvent for extraction of the objectionable constituent I may use any solvent which will extract the objectionable constituent and which is substantially not miscible with the chief constituents of the turpentine. For example, I have found that the use of dilute ethyl alcohol will produce excellent results. The alcohol may be diluted with water or with some other substance, for example sulphuric acid, which will make it less miscible with the turpentine. In place of ethyl alcohol I may, for example, use acetic acid, preferably 95% acetic acid and I have obtained satisfactory results with the use of various alcohols and other substances such as methyl or isopropyl alcohol, methyl ethyl ketone, etc., ethylene or propylene glycols, glycerol, ethylene or propylene chlorhydrins and aniline which if desired may be diluted with water.

In carrying out my method in accordance with my invention no particular form of apparatus is necessary. The solvent is added to the wood turpentine and the mixture thoroughly agitated in order to allow the solvent to thoroughly extract the objectionable constituent. The mixture is then allowed to settle, which results in the separation of the refined turpentine, as an upper layer, and the solvent and an inferior grade of turpentine, in which the objectionable odor constituent is concentrated, as a lower layer. After separation, the refined turpentine is drawn off and either washed with water or fractionally distilled to free it from the small amount of solvent which may be present in it. The inferior grade of turpentine, with which is concentrated the objectionable constituent, may be recovered either by dilution with water or by fractionation. If the process is to be carried out on a large scale, the turpentine may be refined by extracting with successive lots of solvent on the counter current principle.

In carrying out the process in accordance with my invention, in using for example, ethyl alcohol, there are three considerations of importance in obtaining the best results, namely, temperature, concentration of water in the alcohol and ratio of dilute alcohol to turpentine.

As to temperature, I have found that the refining may be carried out at room temperature, though in the case of some solvents, it is preferable to cool to about 10° C. or to refrigerate, cooling to say about 15° F. or lower. Cooling or refrigerating has the effect of enabling a better separation of certain solvents and objectionable odor constituent from the turpentine.

As to the concentration of water in the alcohol, any mixure of alcohol and water which will separate from the turpentine exerts some refining action, but it is preferable to use a dilute alcohol containing, for example, from 60%–80% of alcohol, by volume.

The ratio of dilute alcohol to turpentine may be varied, it being governed by the temperature at which the separation is effected, the degree of dilution of the alcohol and the degree of refining desired.

As a typical example of the method of refining turpentine, in accordance with my invention, using dilute ethyl alcohol as the solvent, 500 cc. of steam distilled wood turpentine, specific gravity 0.862, 90% distilling over at 170° C., is treated or extracted with 68% ethyl alcohol, using 1.4 volumes of the alcohol and effecting separation at 10° C. The turpentine, for example, may be treated with alcohol three times, the mixture of alcohol and turpentine being thoroughly agitated and allowed to separate each time. The upper layer of turpentine, separated after the final treatment with alcohol, is then washed with water to remove any alcohol remaining therein and the product, a turpentine practically free from objectionable odor, obtained.

The turpentine dissolved in the alcohol and separated in the lower layer, is precipitated by the addition of water and may be recovered as an inferior grade of turpentine having a very objectionable odor.

The recovery of refined turpentine from the 500 cc. of wood turpentine amounts to about 450 cc., or about 90% of the original amount treated. The refined turpentine will be found water white in color and substantially free from objectionable odor, while the extracted, or inferior turpentine recovered, will be found pale yellow in color and possessed of an objectionable odor. The following table is comparative of the refined and extracted turpentines:—

|  | Refined turpentine | Extracted turpentine |
|---|---|---|
| Specific gravity | .860 | .882 |
| Boiling range 10% | at 157.3° C. | at 160.0° C. |
| Boiling range 50% | at 160.7° C. | at 168.0° C. |
| Boiling range 90% | at 166.9° C. | at 202.5° C. |

It will now be observed that as a result of my invention, which consists broadly in extracting from turpentine the constituent, the presence of which causes the turpentine to have an objectionable odor, with a solvent substantially immiscible with the chief constituents of the turpentine, wood turpentine may be freed from objectionable odor and rendered available for use in place of gum turpentine to which in many respects it has been recognized as superior.

It will be understood that in setting forth here in detail a typical example of the carrying out of my process, I do not intend that my invention shall be limited thereby, since the details such as selection of a solvent, concentration of water in, or dilution of, the solvent and temperature are capable of variation as will be fully appreciated by those skilled in the art.

Having now fully described my invention, what I claim and desire to protect by Letters Patent is:

The method of refining turpentine which includes extracting turpentine with ethyl alcohol diluted with water to a concentration of about 68% by volume.

In testimony of which invention I have hereunto set my hand, at Kenvil, N. J., on this 19th day of June, 1926.

IRVIN W. HUMPHREY.